United States Patent [19]

Chitayat

[11] Patent Number: 4,834,353
[45] Date of Patent: May 30, 1989

[54] LINEAR MOTOR WITH MAGNETIC BEARING PRELOAD

[76] Inventor: Anwar Chitayat, Duck Island, P.O. Box 107, Northport, N.Y. 11768

[21] Appl. No.: 109,987

[22] Filed: Oct. 19, 1987

[51] Int. Cl.$^4$ .............................................. B23Q 1/02
[52] U.S. Cl. ...................................... 269/73; 310/13; 318/38; 269/289 MR; 269/289 R
[58] Field of Search ......... 269/8, 58, 73, 74, 289 MR, 269/71, 289 R; 384/12, 50, 127, 5 B; 310/12, 13; 318/38, 135

[56] References Cited

U.S. PATENT DOCUMENTS

| | | | |
|---|---|---|---|
| 4,220,899 | 9/1980 | von der Heide | 318/135 |
| 4,234,175 | 11/1980 | Sato et al. | 269/73 |
| 4,392,642 | 6/1983 | Chityat | 269/73 |
| 4,505,464 | 3/1985 | Chityat | 269/73 |
| 4,571,799 | 2/1986 | Chityat | 29/149.5 A |
| 4,667,139 | 5/1987 | Hirai et al. | 318/38 |

Primary Examiner—James G. Smith
Assistant Examiner—Judy J. Hartman
Attorney, Agent, or Firm—Thomas R. Morrison

[57] ABSTRACT

A positioning table includes a pair of parallel rails defining an axis of motion. A movable assembly including a first linear motor assembly disposed for motion along one of the rails. An outboard linear motor assembly on the other rail is rigidly bridged to the first linear motor assembly for concerted motion therewith. The first linear motor assembly includes a plurality of permanent magnets defining a plane at a predetermined angle to the horizontal and an armature defining a plane at the same angle closely spaced from the permanent magnets. The permanent magnets may be disposed on the movable element of the linear motor assembly or on the first rail. The armature is disposed on the other of the movable element and the first rail. First and second bearings on the movable element of the linear motor assembly, which may be air bearings support loads in the vertical and horizontal directions. The predetermined angle establishes the direction of a magnetic attractive vector between the permanent magnets and the armature. The predetermined angle is adjusted to proportion the total load of the static and dynamic load and the magnetic attractive force to a desired value. The outboard linear motor assembly on the second rail includes a plurality of permanent magnets and a second armature. The outboard linear motor assembly and the second rail may include provision for magnetic attraction at the same predetermined angle as that employed in the first linear motor assembly.

12 Claims, 9 Drawing Sheets

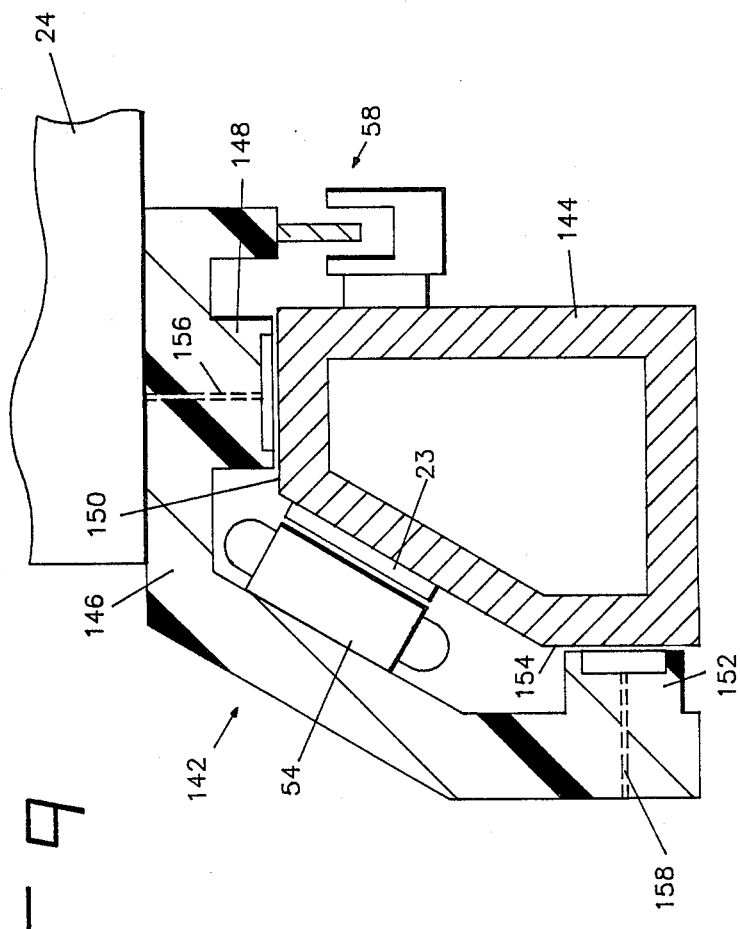

4,834,353

LINEAR MOTOR WITH MAGNETIC BEARING PRELOAD

CROSS REFERENCE TO RELATED APPLICATIONS

The present application is related to U.S. patent application Ser. No. 015,680 and U.S. patent application Ser. No. 109,086, filed on the same date as the present application).

BACKGROUND OF THE INVENTION

The present invention relates to linear motors and, more specifically, to apparatus for guiding and supporting a movable element of a permanent magnet linear motor in a machine tool.

Linear motors conventionally are used in applications requiring the application of modest force along a linear axis. One application, disclosed in U.S. Pat. No. 4,595,870, for example, includes driving one axis of a positioning table for displacing a workpiece along the axis. Such applications are characterized by high precision in positioning, and modest force and acceleration requirements. The linear motor eliminates the windup characteristic of ball-screw drives and substantially reduces the mass of the moving element. Both of these characteristics of linear motors provide benefits in workpiece positioning precision and acceleration.

The force of which linear motors are capable is limited by resistive heating in the windings of the armature of the linear motor. In my U.S. patent application Ser. No. 859,915, I disclose several techniques for cooling a linear motor. In cooling techniques using liquid coolant, I have discovered that it is possible to attain high forces in permanent magnet DC linear motors using a moderate flow of a liquid coolant in thermal contact with the armature windings. The attainable high force permits such linear motors to be used in applications not previously considered for this a class of motors.

In my U.S. Pat. No. 4,505,464, I disclose a positioning table which takes advantage of the magnetic attraction between permanent magnets and armature iron for preloading bearing supporting the movable element of the positioning table. Two sets of magnets in orthogonal planes provide bi-directional preloading.

In my U.S. patent application Ser. No. 015,680, I disclose a high-force linear motor adapted for integration into the bed of a machine tool. Certain machine-tool applications require very long travel at high speeds and accelerations. The present invention addresses one such application wherein, in addition to the foregoing requirements, long linear axes must be accommodated.

OBJECTS AND SUMMARY OF THE INVENTION

It is an object of the invention to provide a permanent magnet linear motor which overcomes the drawbacks of the prior art.

It is a further object of the invention to provide a permanent magnet linear motor having first and second bearing devices with bearing forces disposed at angles to each other and a magnetic attractive force disposed at an angle intermediate the angles of the bearing forces, whereby the single magnetic force is effective for preloading both the first and the second bearing devices.

It is a still further object of the invention to provide a permanent magnet linear motor with first and second bearing devices supporting bearing forces along vectors angularly spaced with respect to each other. The bearing devices are further subject to at least one load unequally applied to the two bearing devices. A magnetic attractive force between permanent magnets and magnetic metal in an armature of the linear motor is disposed at an angle between the vectors of the bearing forces such that a greater contribution of magnetic preload is applied to the one of the first and second bearing devices which bears less of the load, whereby bearing loading is adjusted toward equality.

It is a still further object of the invention to provide a permanent magnet linear motor having indefinite length linear travel.

It is a still further object of the invention to provide a positioning device having a first permanent magnet linear motor employing a first rail for one of its motor elements and a second permanent magnet linear motor employing a second rail parallel to the first rail for supporting an outboard end of the positioning device and for providing coordinated driving force with the first permanent magnet linear motor. First and second bearing devices, angularly spaced apart transfer bearing forces to the first rail. Magnetic attraction in the first linear motor, at an angle intermediate the bearing vectors of the first and second bearing devices preload the first and second bearing devices. At least a third bearing device in the second linear motor transfers the remainder of the load forces to the second rail.

Briefly stated, the present invention provides a positioning table including a pair of parallel rails defining an axis of motion. A movable assembly including a first linear motor assembly disposed for motion along one of the rails. An outboard linear motor assembly on the other rail is rigidly bridged to the first linear motor assembly for concerted motion therewith. The first linear motor assembly includes a plurality of permanent magnets defining a plane at a predetermined angle to the horizontal and an armature defining a plane at the same angle closely spaced from the permanent magnets. The permanent magnets may be disposed on the movable element of the linear motor assembly or on the first rail. The armature is disposed on the other of the movable element and the first rail. First and second bearings on the movable element of the linear motor assembly support loads in the vertical and horizontal directions. The predetermined angle establishes the direction of a mangetic attractive vector between the permanent magnets and the armature. The predetermined angle is adjusted to proportion the total load of the static and dynamic load and the magnetic attractive force to a desired value. The outboard linear motor assembly on the second rail includes a plurality of permanent magnets and a second armature. A bearing associated with the outboard linear motor assembly acts in the vertical direction only. The outboard linear motor assembly and the second rail may include provision for magnetic attraction at the same predetermined angle as that employed in the first linear motor assembly. In one embodiment, a non-magnetic rail is employed with a magnetic metal strip affixed to a surface of the rail backing the plurality of permanent magnets. In another embodiment, a plastic insert in at least one surface of the rail facilitates the creation of a surface having a flatness sufficient for use with an air bearing. In still another embodiment, a unitary motor saddle includes first and second air bearing integrated into a saddle. In a still further embodiment, one or more auxiliary bearings are teamed with air bearings. The auxiliary bearings assume any load in excess of that which the air bearings are capable of supporting. The auxiliary bearings are spaced from an opposing surface such that they undertake mechanical support before their companion air bearings can be forced into mechanical contact with the surface.

According to an embodiment of the invention, there is provided a positioning device for positioning an object along at least one axis comprising: first and second rails disposed parallel to the at least one axis, at least the first rail including a horizontal top surface, a vertical side surface and a first sloping side surface, the first sloping side surface making a predetermined angle with the horizontal, a first movable assembly, movable along the at least one axis, the first movable assembly including a linear motor assembly proximate to the first rail and an outboard linear motor assembly proximate to the second rail, means for rigidly connecting the linear motor assembly to the outboard linear motor assembly for concerted movement thereof, vertical bearing means for supporting vertical forces on the linear motor assembly on the horizontal top surface, horizontal bearing means for supporting horizontal forces on the linear motor assembly on the vertical side surface, a first plurality of permanent magnets defining a first plane parallel to the first sloping side surface, an armature having magnetically attractable material therein defining a second plane parallel to the first sloping side surface and closely spaced facing the first plane, whereby a first magnetic attraction exists therebetween, the first plurality of permanent magnets being disposed on one of the first sloping side surface and the first movable assembly and the armature being disposed on the other of the first sloping side surface and the first movable assembly, the second rail having a second horizontal top surface, the outboard linear motor assembly including second vertical bearing means for bearing against the second horizontal top surface, and the predetermined angle being a value effective for apportioning a total load on the vertical and horizontal bearing means in a predetermined proportion.

According to a feature of the invention, there is provided a positioning device for positioning a load along first and second axes comprising: first and second rails disposed parallel to the first axis, at least the first rail including a horizontal top surface, a vertical side surface and a first sloping side surface, the first sloping side surface making a predetermined angle with the horizontal, a first movable assembly, movable along the first axis, the first movable assembly including a linear motor assembly proximate to the first rail and an outboard linear motor assembly proximate to the second rail, third and fourth rails rigidly connecting the linear motor assembly to the outboard linear motor assembly for concerted movement thereof, vertical bearing means for supporting vertical forces on the linear motor assembly on the horizontal top surface, horizontal bearing means for supporting horizontal forces on the linear motor assembly on the vertical side surface, a first plurality of permanent magnets defining a first plane parallel to the first sloping side surface, an armature having magnetically attractable material therein defining a second plane parallel to the first sloping side surface and closely spaced facing the first plane, whereby a first magnetic attraction exists therebetween, the first plurality of permanent magnets being disposed on the first sloping side surface and the armature being disposed on the first movable assembly, the second rail having a second horizontal top surface, the outboard linear motor assembly including second vertical bearing means for bearing against the second horizontal top surface, the predetermined angle being a value effective for apportioning a total load on the vertical and horizontal bearing means in a predetermined proportion, a second sloping side surface on the second rail, the second sloping side surface being at a second predetermined angle inclined in the same direction as the first sloping side surface, the second sloping side surface including magnetically attractable material, a second plurality of permanent magnets on the outboard bearing assembly, the second plurality of permanent magnets defining a third plane closely spaced facing the second sloping side surface, whereby a second magnetic attraction is exerted in the outboard linear motor assembly, the third and fourth rails defining a second axis at right angles to the at least one axis, and a second movable assembly on the third and fourth rails, whereby an X-Y device is provided.

According to a further feature of the invention, there is provided a linear motor comprising: a rail, a plurality of permanent magnets disposed on a surface of the rail, a movable member, the movable member including an armature containing magnetically attractable material, bearing means for supporting the movable member in a position spacing a surface of the armature to a surface of the plurality of permanent magnets, the bearing means including an air bearing, the rail including a surface facing the air bearing, the air bearing being effective in normal operation for supporting the movable member with a spacing D1 between the air bearing and the surface, the bearing means including at least one auxiliary bearing, the auxiliary bearing including means for preventing the air bearing from approaching closer than a distance D2 between the air bearing and the surface, distance D2 is less than D1, and distance D2 is greater than zero.

According to a still further feature of the invention, there is provided a linear motor comprising: a rail, a plurality of permanent magnets disposed on a first surface of the rail, a movable member, the movable member including an armatue containing magnetically attractable material, an air bearing affixed to the movable member, an insert in the rail forming a second surface facing the air bearing, the air bearing being effective in normal operation for supporting the movable member with a nominal spacing D1 between the air bearing and the second surface, and the insert being of a material different from a remainder of the rail and of a type permitting easier attainment of flatness of the second surface than the remainder of the rail.

According to another feature of the invention, there is provided a linear motor comprising: a rail, a plurality of permanent magnets disposed on a surface of the rail, a movable member, the movable member including an armature containing magnetically attractable material, bearing means affixed to the movable member, the bearing means including means for supporting the movable member against a total load applied between the movable member and the rail, the rail including a longitudinal cavity therein, and a vibration-damping material in the longitudinal cavity.

According to yet another feature of the invention, there is provided a linear motor comprising: a rail, a plurality of permanent magnets disposed on a first surface of the rail, a movable member, the movable member including a saddle, an armature containing magnetically attractable material affixed to the saddle, the armature being disposed facing the plurality of permanent magnets, a second surface on the rail, the second surface defining a first supporting plane, a third surface on the rail, the third surface defining a second supporting plane, the first and second supporting planes being non-coplanar, a first air bearing in the saddle, the first air bearing facing the first supporting plane, a second air bearing in the saddle, the second air bearing facing the second supporting plane, and at least the first air bearing being unitary with the saddle.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 9 is a cross section of an X linear motor assembly according to a final embodiment of the invention.

DETAILED DESCRIPTION OF THE PREFERRED EMBODIMENT

Figure 1:
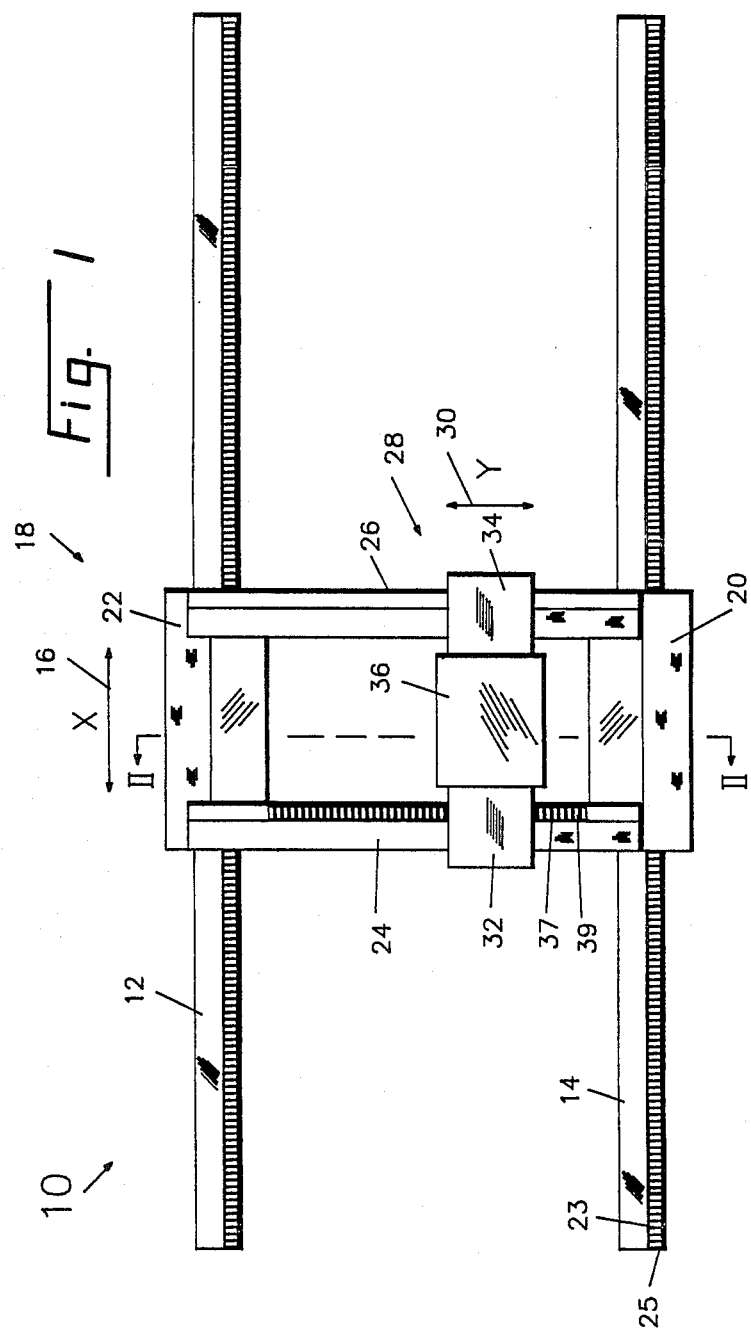
FIG. 1 is a top view of an X-Y positioning table according to an embodiment of the invention.

Referring to FIG. 1, there is shown, generally at 10, a positioning table according to an embodiment of the invention. First and second parallel X-axis rails 12 and 14 are supported by conventional means, not shown, to define an arbitrarily named X axis as indicated by an X-axis arrow 16.

An X movable assembly 18 is disposed on X-axis rails 12 and 14 for motion along the X axis as indicated by X-axis arrow 16. X movable assembly 18 includes an X linear motor assembly 20 disposed on X-axis rail 14 and an X outboard linear motor assembly 22 disposed on X-axis rail 12. A plurality of permanent magnets 23 are disposed on a sloping surface 25 of X-axis rail 14. Permanent magnets 23 are part of X linear motor assembly 20 and a bearing-preloading system, as will be explained. A like plurality of permanent magnets 70 are disposed on a sloping surface 66 of X-axis rail 12.

First and second parallel Y-axis rails 24 and 26 rigidly tie together X linear motor assembly 20 and X outboard linear motor assembly 22 for concerted motion along the X axis. A Y movable assembly 28 is disposed on Y-axis rails 24 and 26 for motion along an arbitrarily named Y axis as indicated by a Y-axis arrow 30. For present purposes, Y movable assembly 28 may be the same as, or different from X movable assembly 18. For concreteness of description, Y movable assembly 28 is illustrated with a Y linear motor 32 on Y-axis rail 24 and a Y outboard bearing assembly 34 on Y-axis rail 26. A workpiece support table 36 rigidly ties together Y linear motor 32 and Y outboard bearing assembly 34 for concerted motion along the Y axis. A plurality of permanent magnets 37 are disposed on a sloping surface 39 of Y-axis rail 24. Permanent magnets 37 are employed with Y linear motor 32 in the same manner that will be described for the employment of permanent magnets 23 with X linear motor assembly 20.

A conventional control system may be employed to drive X linear motor assembly 20 and Y linear motor 32 along their respective axes, whereby any desired point on workpiece support table 36 may be positioned anywhere within the large area defined by the extents of the X and Y axes. One skilled in the art will recognize that additional degrees of freedom may be employed in a positioning system without departing from the spirit and scope of the present invention. For example, a further positioning device (not shown) may be disposed on workpiece support table 36 for motion along an arbitrarily named axis normal to the plane of the page. In addition, one or more rotational devices (not shown) may be provided.

In a different application positioning table 10 may be employed as part of a machine tool (not shown) for operating on a workpiece disposed below workpiece support table 36. In such an application, workpiece support table 36 may be replaced by any suitable apparatus such as, for example, a chuck (not shown) as required.

Figure 2:
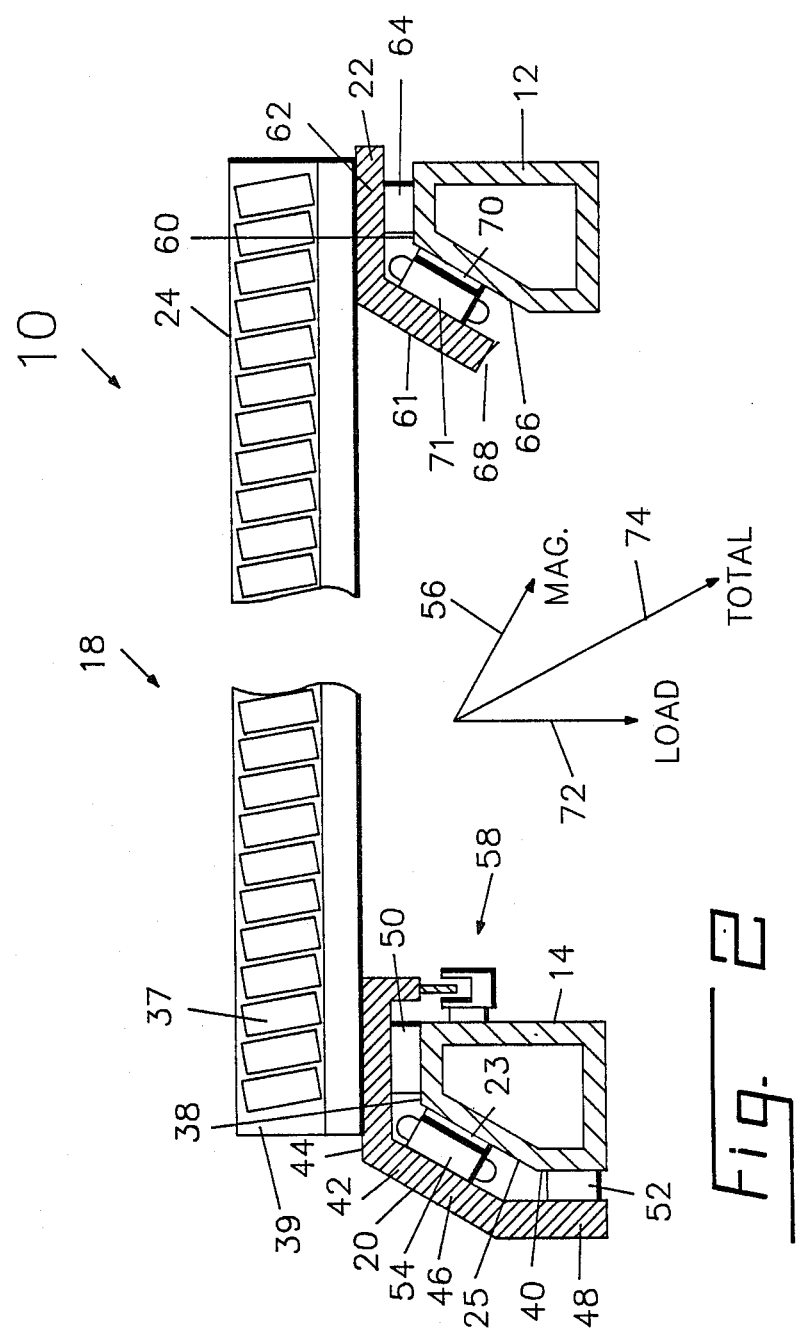
FIG. 2 is a cross section taken along II—II in FIG. 1.

Referring now to FIG. 2, X-axis rail 14 is better seen to include a horizontal top surface 38 and a vertical side surface 40 at opposed edges of sloping surface 25. X linear motor assembly 20 includes a saddle 42 having a horizontal top arm 44 facing horizontal top surface 38, an angled arm 46 facing sloping surface 25 and a vertical side arm 48 facing vertical side surface 40. A vertical load bearing 50 transfers vertical components of static and dynamic load from horizontal top arm 44 to horizontal top surface 38 of X-axis rail 14. Similarly, a horizontal load bearing 52 transfers horizontal components of static and dynamic load from vertical side arm 48 to vertical side surface 40 of X-axis rail 14. Vertical load bearing 50 and horizontal load bearing 52 may be of any convenient type including sliding blocks, air bearings and rolling bearings. For purposes of the present portion of the description, it is assumed that vertical load bearing 50 and horizontal load bearing 52 are conventional air bearings.

X linear motor assembly 20 includes an armature 54 closely spaced from the surfaces of permanent magnets 23. Armature 54 contains a plurality of windings upon a structure of magnetically attractable metal. A static magnetic attraction between permanent magnets 23 and the magnetically attractable metal in armature 54 acts along a line normal to the facing surfaces thereof. The direction and magnitude of the magnetic attraction is indicated by an arrow 56.

A conventional device such as, for example, an optical scale 58, provides position and/or velocity information to a conventional control system (not shown) associated with positioning table 10. Since such a control system may be conventional and may not be considered to represent an inventive part of the present invention, further description thereof is properly omitted.

Although not necessary to the practice of the invention, X-axis rail 14 preferably is hollow and most preferably is a hollow tube of magnetic metal such as, for example, steel. The steel provides a return path for magnetic flux between adjacent permanent magnets 23.

X-axis rail 14 may be supported at its ends in suitable installations or may be supported periodically or continuously along its bottom surface.

X-axis rail 12 includes a horizontal top surface 60 facing a horizontal arm 62 of a saddle 61. A vertical load bearing 64 transfers vertical static and dynamic loads from horizontal arm 62 to X-axis rail 12. Vertical load bearing 64 may be of any convenient type such as, for example, slide, rolling or air bearing. In the preferred embodiment, vertical load bearing 64 is an air bearing.

It will be noted that X outboard linear motor assembly 22 does not include a horizontal bearing counterpart to horizontal load bearing 52 in X linear motor assembly 20. This permits thermal growth of Y-axis rail 24 (and Y-axis rail 26, not shown) without interfering with the operation of positioning table 10. An embodiment of X outboard linear motor assembly 22 which includes a horizontal bearing should be considered an optional part of the present invention, however.

Sloping surface 66 on X-axis rail 12 preferably has the same slope oriented in the same direction as sloping surface 25 of X linear motor assembly 20.

Saddle 61 includes a sloping arm 68. Sloping arm 68 preferably has a slope matching that of sloping surface 66. Permanent magnets 70, disposed on 66, are closely spaced from an armature 71. Magnetic attraction between permanent magnets 70 and armature 71 applies a magnetic preload as indicated by arrow 56.

For purposes of description, it is herein assumed that a load vector 72 operates in the vertical direction shown. A vector sum of the magnetic and load vectors yields a total vector 74 borne by the bearings. It will be recognized by one skilled in the art that the magnetic attractions in X linear motor assembly 20 and X outboad linear motor assembly 22 act in substantially the same direction. Such is not, however, a necessary limitation. For example, a permanent magnet 70 and armature 71 may be reoriented to face each other along a horizontal plane, whereby the magnetic attractive force of these elements may be vertical. In addition, during load acceleration, the inertial contribution of the load may be other than along the vertical line indicated by load vector 72.

In some applications, it may be desirable to apply substantially equal loads to vertical load bearing 50 and horizontal load bearing 52. For this purpose, the angle between the plane of sloping surface 25 (and sloping surface 66) and the horizontal is adjusted to attain the desired proportioning of loads. In one embodiment of the invention, a rough proportioning is attained with such angles set at 60 degrees from the horizontal. Other angles may be chosen for different loads, magnetic attractive forces or other purposes.

Y movable assembly 28 (FIG. 1) may operate in the same fashion as X movable assembly 18, described above. In such an apparatus, a plurality of permanent magnets 37 are disposed on a sloping surface 39. It will be recognized that permanent magnets 37 may be omitted and Y-axis rail 24 may be reshaped if different drive and retention means are employed.

It is well recognized that the positions of permanent magnets 23 and 70 and their related armatures 54 and 71, respectively, are interchangeable. That is, permanent magnets 23 may be disposed on an inner surface of angled arm 46 and armature 54 may be disposed on sloping surface 25. The positions of permanent magnets 70 and armature 71 may be similarly reversed. In the prior art, such an arrangement is preferred in order to use a long armature as a heat sink. With my new techniques for cooling armatures 54 and 71, I am able to use short armatures 54 and 71 mounted on angled arms 46 and 68, respectively, with full long arrays of permanent magnets 23 and 70 on X-axis rails 14 and 12, respectively, without experiencing overheating problems.

It is preferred that magnetic attractive forces exerted in X outboard linear motor assembly 22 act in a direction which adds to the magnetic attractive forces in X linear motor 20, and that the two magnetic attractive forces do not have components in opposition to each other. Thus, the angle of sloping surface 66 is preferably from 0 to 90 degrees from the horizontal, when the angle of sloping surface 25 from the horizontal is between 0 and 90 degrees.

Vertical load bearings 50 and 64 provide support to their respective linear motor assemblies as a result of an air film produced by a supply of air flowing through the air bearings to the facing surfaces of the air bearings and their respective horizontal surfaces. For purposes of the following description, X linear motor assembly 20 and X outboard linear motor assembly 22 are considered to be identical.

Figure 3:
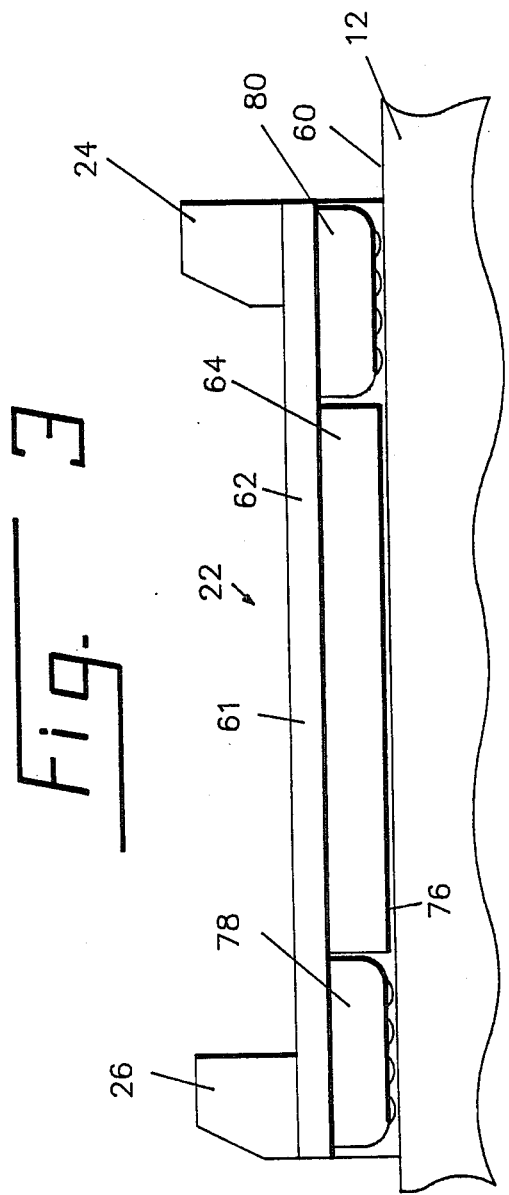
FIG. 3 is an enlarged side view of the X outboard linear motor assembly of FIGS. 1 and 2.

Referring now to FIG. 3, typically vertical load bearing 64 may produce an air film inducing a separation of about 0.001 inch between its bottom surface 76 and the facing horizontal top surface 60 of X-axis rail 12 and may be capable of supporting about 1000 pounds. When the load-bearing capability of vertical load bearing 64 is exceeded, one or both of two undesirable results may ensue. First, contact between bottom surface 76 and horizontal top surface 60 may damage the surfaces of one or both of these elements. If one surface becomes gouged, the ability of vertical load bearing 64 to support its load on a predetermined thickness of air film is degraded or destroyed. Second, the changing dimension of the air film may introduce positioning errors in the workpiece or tool being controlled. That is, in high-acceleration or horizontal-load applications momentary vertical forces on X outboard linear motor assembly 22 may increase and decrease the thickness of the air film over a range on the order of the nominal separation of, for example, 0.001 inch. In addition, overturning moments on X outboard linear motor assembly 22 may tend to urge one end of bottom surface 76 toward horizontal top surface 60 while attempting to elevate the other end thereof. Thus, damage to one end of bottom surface 76 may occur, resulting in excessive air leakage and loss of load-bearing capability at that end.

One solution to this problem includes auxiliary means such as, for example, auxiliary bearings 78 and 80, disposed at opposed ends of vertical load bearing 64. Auxiliary bearings 78 and 80 are identical both structurally and functional, consequently, only auxiliary bearing 80 is described in detail.

Figure 4:
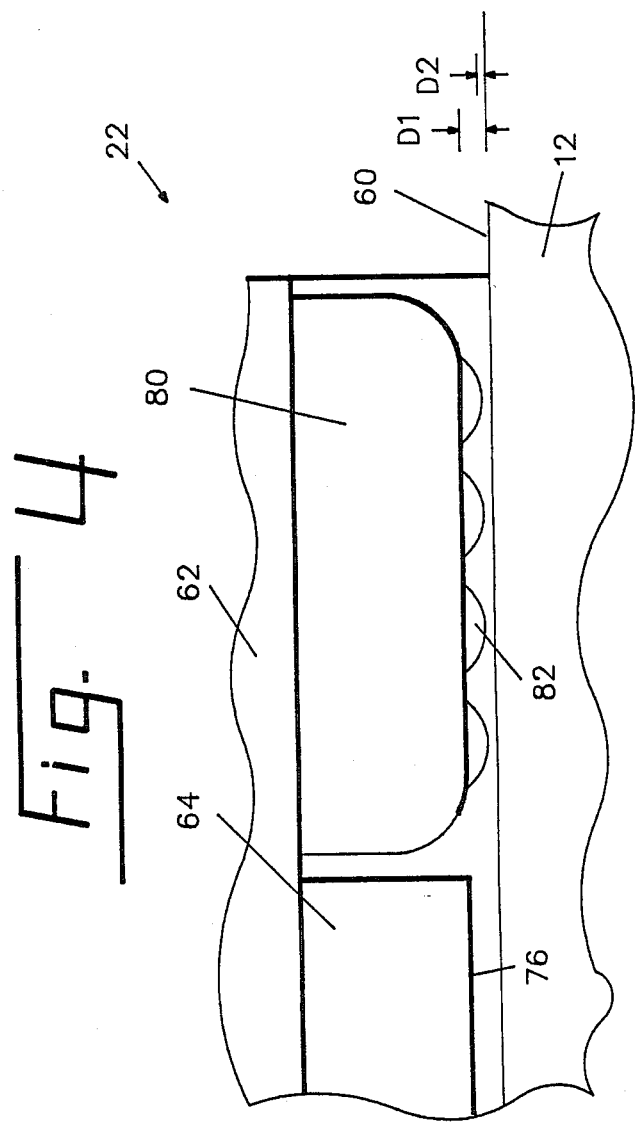
FIG. 4 is a further enlarged view of a portion of FIG. 3.

Referring now to FIG. 4, and enlarged view of adjacent portions of vertical load bearing 64 and auxiliary bearing 80 illustrates a first nominal distance D1 between bottom surface 76 and horizontal top surface 60 of X-axis rail 12. Auxiliary bearing 80 includes bearing means such as, for example, roller bearings 82 spaced a second nominal distance D2 from horizontal top surface 60. Distance D2 is smaller than distance D1. In the event that a load on X outboard linear motor assembly 22 decreases the thickness of the air film between bottom surface 76 and horizontal top surface 60 by an amount equal to D1–D2, roller bearings 82 come into contact with horizontal top surface 60, whereby bottom surface 76 is maintained out of contact with horizontal top surface 60 and contact damage to bottom surface 76 is avoided. Also, since auxiliary bearing 80 provides solid bearing support for horizontal arm 62, while roller bearings 82 are in contact with horizontal top surface 60, the thickness of the air film remains constant. For purposes of description, with distance D1 equal to about 0.001 inch, distance D2 may be about 0.0005 inch. Thus, the minimum thickness of the air film is limited to about 0.0005 inch.

Air bearings are often selected for applications such as those of the present disclosure because they do not require contact with horizontal top surface 60 during normal operation. Thus, wear resulting from contact-type bearings such as, for example, roller bearings 82 is avoided. The overload protection provided by auxiliary bearing 80 retains this advantage under normal operation. Even under abnormal operation with roller bearings 82 in contact with horizontal top surface 60, wear and distortion of horizontal top surface 60 is greatly reduced as compared to the case when only contact-type bearings are provided. Even when load conditions urge roller bearings 82 into contact with horizontal top surface 60, vertical load bearing 64 continues to provide a supporting force, and thereby substantially reduces the portion of the load which must be borne by roller bearings 82. For example, if vertical load bearing 64 is capable of supporting a load of 1000 pounds before roller bearings 82 contact horizontal top surface 60, and a total load of 1200 pounds is applied to X outboard linear motor assembly 22, if the load is equally applied to both ends of vertical load bearing 64, then auxiliary bearing 80 is required to support only half of the excess, namely 100 pounds. Such light loading on roller bearings 82 is unlikely to damage even a finely finished horizontal top surface 60.

Figure 5:
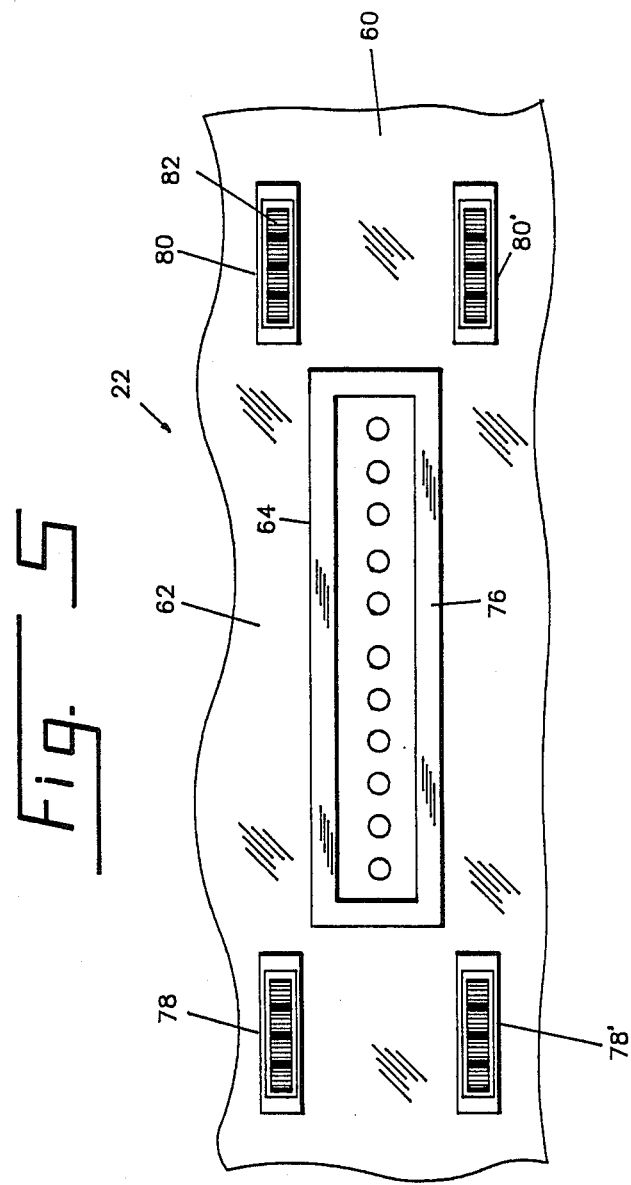
FIG. 5 is a bottom view of the X outboard linear motor assembly of FIG. 3.

Referring now to FIG. 5, an underside view of one arrangement of X outboard linear motor assembly 22 is shown. Auxiliary bearing 80 may include first and second auxiliary bearings 80 and 80', one on either side of the track of vertical load bearing 64. Similarly, auxiliary bearing 78 may include first and second auxiliary bearings 78 and 78', correspondingly placed. Placement of auxiliary bearings 78, 78', 80 and 80' outide the track bottom surface 76 ensues that, even if peening or other deformation of horizontal top surface 60 takes place by contact with roller bearings 82, no effect will be reflected in the finish of the facing surfaces of horizontal top surface 60 and bottom surface 76. As a consequence, normal operation is preserved.

An embodiment of the invention is contemplated wherein only a single auxiliary bearing 80 and a single auxiliary bearing 78 is disposed centered in the track of vertical load bearing 64.

Certain bearing materials are available permitting high-speed sliding contact with minimum wear. A plastic bearing material such as, for example, a material sold under the trademark Turkite, may be substituted for roller bearings 82 to provide a minimum air-film dimension with assumption of excess load. In one embodiment of the invention, vertical load bearing 64 is fabricated of a plastic bearing material and auxiliary bearings 78 and 80 (together with auxiliary bearings 78' and 80', if used) may be eliminated. Since a plastic bearing material bearing against a steel surface of horizontal top surface 60 is unlikely to cause deformation or wear on horizontal top surface 60, separate auxiliary bearings employing such materials may be disposed within the track of vertical load bearing 64 without concern for damage to horizontal top surface 60.

Due to the small thickness of the air film, tolerances on the flatness of the portion of horizontal top surface 38 and 60 facing vertical load bearings 50 (FIG. 1) and 64 are extremely tight. This is seen from the above example dimensions permitting a total range of air-film thickness of only 0.0005 inch (five ten-thousandths of an inch). To prevent contact, horizontal top surfaces 38 and 60 must be flat to better than this value for spans equal to the lengths of vertical load bearings 50 and 64 over the entire lengths of X-axis rails 12 and 14. In machines having lengths of X-axis rails 12 and 14 on the order of a few inches to a few dozen inches, such flatness is attainable using steel for X-axis rails 12 and 14 by machining, grinding and finally polishing horizontal top surfaces 38 and 60. Although expensive, such treatment is successful in short machines. In machines requiring X-axis rails 12 and 14 on the order of several feet, attaining the required flatness in a steel surface is either very expensive, on infeasible.

Figure 6:
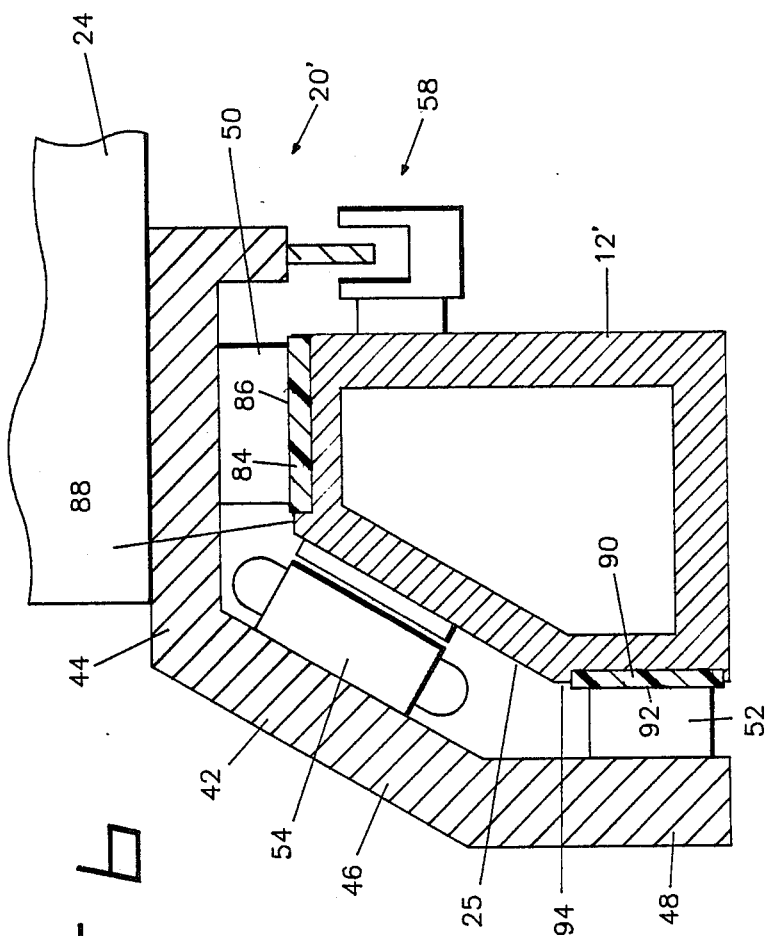
FIG. 6 is a cross section of an X linear motor assembly according to a second embodiment of the invention.

Referring now to FIG. 6, a X linear motor assembly 20' is shown wherein a X-axis rail 12' includes a steel structure having substantially the same shape as in previous embodiments except that a plastic insert 84 having a flat horizontal surface 86 is disposed in an upper surface 88 thereof. Vertical load bearing 50 faces flat horizontal surface 86 for producing a supporting film of air. Similarly, a plastic insert 90 having a flat vertical surface 92 is disposed in a side surface 94 of X-axis rail 12'.

It is possible to mold plastic inserts 84 and 94 having the required flatnesses of flat horizontal surface 86 and flat vertical surface 92 much more economically than similar flatness can be attained in the surface of an all-steel structure. Although molded plastic inserts 84 and 90 are more susceptible to damage from contact with vertical load bearing 50 and horizontal load bearing 52, respectively, the above-described techniques for eliminating contact or ameliorating such damage may be employed to permit using this embodiment of the invention. Any suitable material such as, for example, Turkite, may be employed in plastic insert 84 and plastic insert 90. Flat horizontal surface 86 and flat vertical surface 92 may be formed with the required finish during molding of plastic inserts 84 and 90 or they may require additional finishing after molding.

Figure 7:
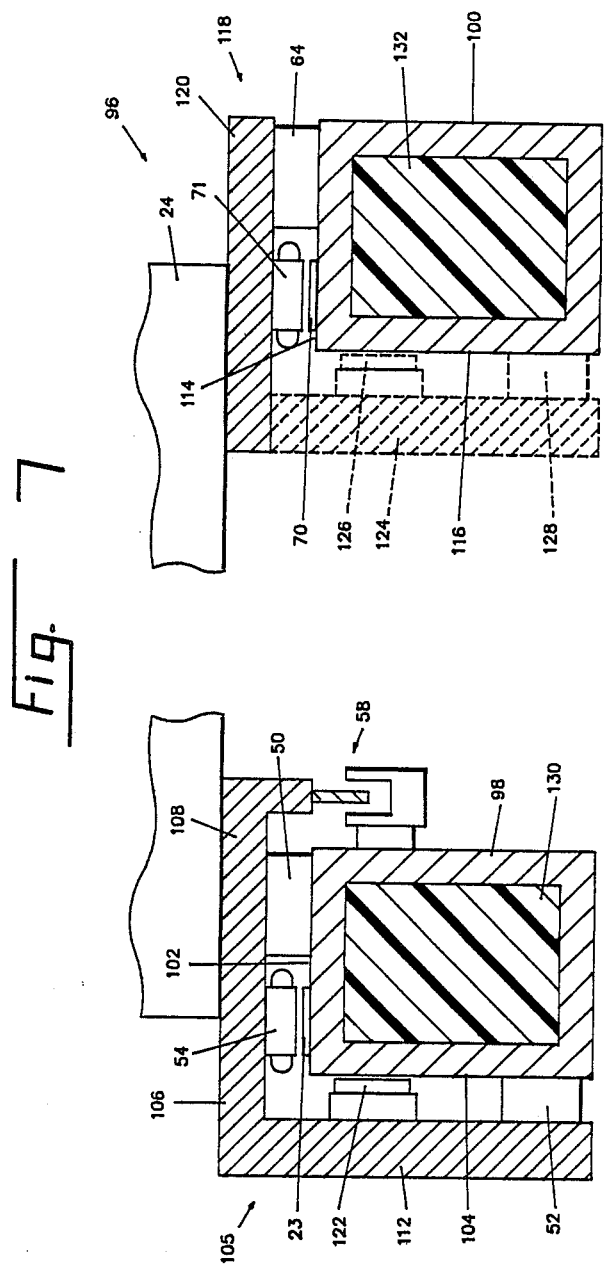
FIG. 7 is a cross section of a positioning device according to a further embodiment of the invention.

Referring now to FIG. 7, there is shown, generally at 96, a positioning table according to a further embodiment of the invention. First and second X-axis rails 98 and 100 each have a rectangular cross section. X-axis rail 98 includes a horizontal upper surface 102 and a vertical side surface 104. An X linear motor assembly 105 includes a saddle 106 having a horizontal plate 108 spaced parallel to horizontal upper surface 102 and a vertical side surface 112 spaced parallel to vertical side surface 104. Horizontal upper surface 102 has a width sufficient to accommodate vertical load bearing 50 and armature 54 side by side on horizontal plate 108. As in prior embodiments armature 54 interacts with permanent magnets 23, mounted on horizontal upper surface 102, to produce forces urging saddle 106 along the X axis.

X-axis rail 100 includes a horizontal top surface 114 and a vertical side surface 116. An X outboard linear motor assembly 118 includes at least a horizontal plate 120 spaced parallel to horizontal top surface 114. 4 and armature 71 are disposed side by side on vertical side surface 1120.

In the prior embodiments, the diagonal action angle of the combined magnetic and load forces produced transverse as well as vertical forces on the two X linear motors. In the embodiment of FIG. 7, the action angle of magnetic attraction between armarture 54 and permanent magnets 23, as well as between armature 71 and permanent magnets 70 is vertical. It will be clear to one skilled in the art that some means for lateral must be provided for positioning table 96. Mechanical guides or opposed air bearings (neither of which are shown) or any other convenient guidance technique may be used. One possibility includes a plurality of magnets 122 disposed on vertical side surface 112 spaced closely from vertical side surface 104. Magnetic attraction between magnets 122 and X-axis rail 98 provide a force tending to urge saddle 106 rightward in the figure. Rightward motion of saddle 106 is resisted by horizontal load bearing 52 disposed alongside magnets 122 facing vertical side surface 104.

Horizontal magnetic holding force resisted by an air bearing optionally may be employed on X outboard linear motor assembly 118. Thus, a vertical plate 124 may be spaced parallel to vertical side surface 116 for supporting a plurality of permanent magnets 126 close to vertical side surface 116 and a vertical side surface 116 for resisting excess motion of vertical plate 124 toward the right. The optional nature of these elements is indicated by their being illustrated in dashed line. As in prior embodiments, these optional horizontal retention elements may be omitted in applications where their presence is prohibited by thermal expansion of Y-axis rail 24.

X-axis rails 98 and 100 may contain damping masses 130 and 132 for damping vibration which may otherwise occur in long hollow elements such as these. Any suitable material may be employed for damping vibration such as, for example, a damping tile conforming to Military Specification MIL-P-23653 and available commercially from the Lord Corporation. Although illustrated in the environment of rectangular X-axis rails 98 and 100, damping masses are equally applicable to all emodiments of the invention disclosed herein for applications requiring vibration damping.

Figure 8:
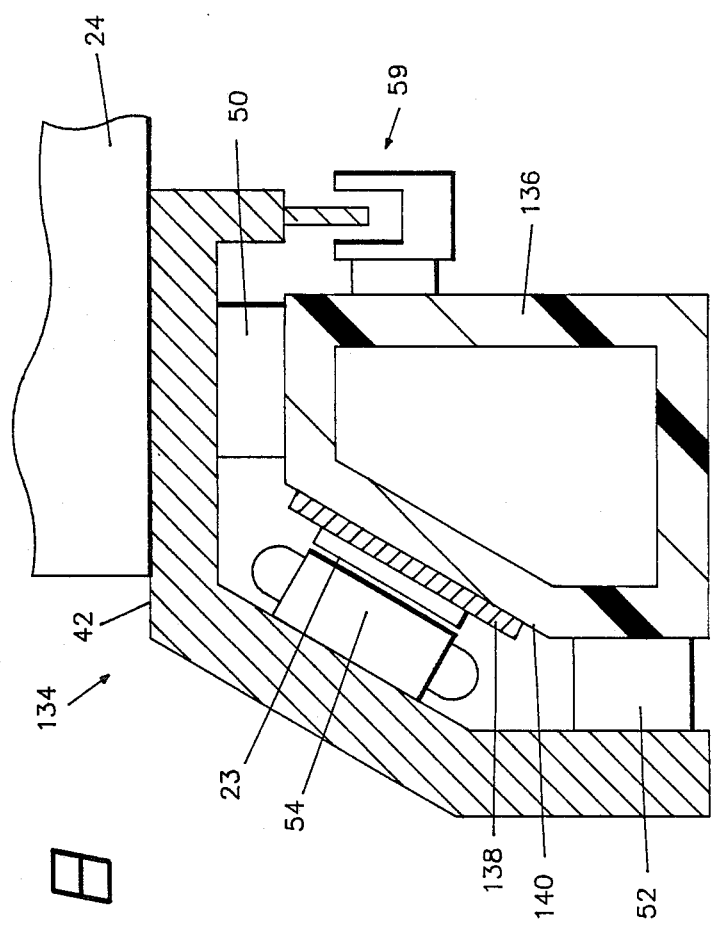
FIG. 8 is a cross section of an X linear motor assembly according to a still further embodiment of the invention.

Referring now to FIG. 8, an embodiment of the invention is shown in which an X linear motor assembly 134 is disposed on a X-axis rail 136 made of a non-metallic material such as, for example a graphite-epoxy composite. A graphite-epoxy matrix structure in X-axis rail 136 is lighter and stiffer compared steel. One disadvantage, however, is the lack of a magnetic return path behind permanent magnets 23. A metallic plate 138 is affixed to a sloping surface 140. Permanent magnets 23 are, in turn, affixed to metallic plate 138. In this manner, the desired magnetic return path between adjacent permanent magnets 23 is provided. A second parallel X-axis rail (not shown) for an X outboard linear motor assembly (not shown) may be fabricated of a non-magnetic material with a metallic plate for providing a magnetic return path. Since such a second X-axis rail corresponds to that illustrated in FIG. 8, with modifications according to the foregoing disclosure, further discussion thereof would be redundant and is therefore omitted.

It would be clear that a corresponding structure using a metallic plate for magnetic return on a rectangular non-metallic (or non-magnetic metal) X-axis rail without could be used without departing from the scope of the invention.

Referring now to FIG. 9, there is shown, generally at 142, an X linear motor assembly according to a still further embodiment of the invention. A metallic or non-metallic X-axis rail 144 (The hatching is for metal. Hatching for non-metal is not shown.) is embraced by a saddle assembly 146 cast, molded or laid up in a unitary assembly including a vertical air bearing 148 transferring vertical loads to a horizontal top surface 150 of X-axis rail 144 and a horizontal air bearing 152 transferring horizontal loads to a vertical side surface 154 of X-axis rail 144. An air channel 156 may be integrated into vertical air bearing 148 for admitting a flow of air thereto. Similarly, an air channel 158 may be integrated info horizontal air bearing 152. Techniques for controlling a flow of air to vertical air bearing 148 and air channel 158 are well known and their description therefore is omitted herefrom.

Although any suitable material may be employed for saddle assembly 146, a graphite-resin composite is preferred because of the decreased weight and increased stiffness attainable with such material.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A positioning device for positioning an object along at least one axis comprising:

first and second rails disposed parallel to said at least one axis;

at least said first rail including a horizontal top surface, a vertical side surface and a first sloping side surface;

said first sloping side surface making a predetermined angle with the horizontal;

a first movable assembly, movable along said at least one axis;

said first movable assembly including a linear motor assembly proximate to said first rail and an outboard linear motor assembly proximate to said second rail;

means for rigidly connecting said linear motor assembly to said outboard linear motor assembly for concerted movement thereof;

vertical bearing means for supporting vertical forces on said linear motor assembly on said horizontal top surface;

horizontal bearing means for supporting horizontal forces on said linear motor assembly on said vertical side surface;

a first plurality of permanent magnets defining a first plane parallel to said first sloping side surface;

an armature having magnetically attractable material therein defining a second plane parallel to said first sloping side surface and closely spaced facing said first plane, whereby a first magnetic attraction exits therebetween;

said first plurality of permanent magnets being disposed on one of said first sloping side surface and said first movable assembly and said armature being disposed on said other of said first sloping side surface and said first movable assembly;

said second rail having a second horizontal top surface;

said outboard linear motor assembly including second vertical bearing means for bearing against said second horizontal top surface; and said predetermined angle being a value effective for apportioning a total load on said vertical and horizontal bearing means in a predetermined proportion.

2. A positioning device according to claim 1 wherein said first sloping side surface is disposed between said horizontal top surface and said vertical side surface.

3. A positioning device according to claim 1 wherein said first plurality of permanent magnets are disposed on said first sloping side surface.

4. A positioning device according to claim 3 wherein said first rail is steel.

5. A positioning device according to claim 1 wherein said predetermined angle is greater than 45 degrees, whereby said first magnetic attraction adds more load to said horizontal bearing means than it does to said vertical bearing means, and components of said total load on said horizontal bearing means and said vertical bearing means are more nearly equal.

6. A positioning device according to claim 1 wherein at least one of said horizontal bearing means, said vertical bearing means and said second vertical bearing means is an air bearing.

7. A positioning device according to claim 6 wherein all of said horizontal bearing means, said vertical bearing means and said second vertical bearing means are air bearings.

8. A positioning device according to claim 1, further comprising:

a second sloping side surface on said second rail, said second sloping side surface being at a second predetermined angle inclined in said same direction as said first sloping side surface;

said second sloping side surface including magnetically attractable material, a second plurality of permanent magnets on said outboard linear motor assembly; and said second plurality of permanent magnets defining a third plane closely spaced facing said second sloping side surface, whereby a second magnetic attraction is exerted in said outboard linear motor assembly.

9. A positioning device according to claim 8 wherein said first and second predetermined angles are equal.

10. A positioning device according to claim 8 wherein said second predetermined angle is from about 0 to about 90 degrees.

11. A positioning device according to claim 1, further comprising:

said means for rigidly connecting including third and fourth rails parallel to each other and at right angles to said first and second rails;

said third and fourth rails defining a second axis at right angles to said at least one axis; and a second movable assembly on said third and fourth rails, whereby an X-Y device is provided.

12. A positioning device for positioning a load along first and second axes comprising:

first and second rails disposed parallel to said first axis;

at least said first rail including a horizontal top surface;

a vertical side surface and a first sloping side surface;

said first sloping side surface making a predetermined angle with the horizontal;

a first movable assembly, movable along said first axis;

said first movable assembly including a linear motor assembly proximate to said first rail and an outboard linear motor assembly proximate to said second rail;

third and fourth rails rigidly connecting said linear motor assembly to said outboard linear motor assembly for concerted movement thereof;

vertical bearing means for supporting vertical forces on said linear motor assembly on said horizontal top surface;

horizontal bearing means for supporting horizontal forces on said linear motor assembly on said vertical side surface;

a first plurality of permanent magnets defining a first plane parallel to said first sloping side surface;

an armature having magnetically attractable material therein defining a second plane parallel to said first sloping side surface and closely spaced facing said first plane, whereby a first magnetic attraction exists therebetween;

said first plurality of permanent magnets being disposed on said first sloping side surface and said armature being disposed on said first movable assembly;

said second rail having a second horizontal top surface;

said outboard linear motor assembly including second vertical bearing means for bearing against said second horizontal top surface;

said predetermined angle being a value effective for apportioning a total load on said vertical and horizontal bearing means in a predetermined proportion;

a second sloping side surface on said second rail;

said second sloping side surface being at a second predetermined angle inclined in said same direction as said first sloping side surface;

said second sloping side surface including magnetically attractable material;

a second plurality of permanent magnets on said outboard bearing assembly;

said second plurality of permanent magnets defining a third plane closely spaced facing said second sloping side surface, whereby a second magnetic attraction is exerted in said outboard linear motor assembly;

said third and fourth rails defining a second axis at right angles to said at least one axis; and a second movable assembly on said third and fourth rails, whereby an X-Y device is provided.

* * * * *